United States Patent
Han

(10) Patent No.: US 8,904,199 B2
(45) Date of Patent: Dec. 2, 2014

(54) APPARATUS AND METHOD FOR CONTROLLING POWER RELATED PARAMETERS BY CORE UNIT ACCORDING TO DETAILED STATUS INFORMATION OF THE CORE AND APPLICATION FOR EXECUTING

(75) Inventor: Jin Ho Han, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 13/207,484

(22) Filed: Aug. 11, 2011

(65) Prior Publication Data

US 2012/0131356 A1 May 24, 2012

(30) Foreign Application Priority Data

Nov. 23, 2010 (KR) .................. 10-2010-0117121

(51) Int. Cl.
G06F 1/00 (2006.01)
G06F 1/32 (2006.01)
G06F 1/26 (2006.01)

(52) U.S. Cl.
CPC . *G06F 1/324* (2013.01); *G06F 1/26* (2013.01)
USPC ........................................ 713/300

(58) Field of Classification Search
CPC .................. G06F 1/26; G06F 1/324
See application file for complete search history.

(56) References Cited

U.S. PATENT DOCUMENTS

| 6,313,683 | B1 * | 11/2001 | Block et al. .................. 327/295 |
| 7,111,179 | B1 * | 9/2006 | Girson et al. ................. 713/300 |
| 2006/0282692 | A1 * | 12/2006 | Oh ................................ 713/300 |
| 2008/0209243 | A1 * | 8/2008 | Ghiasi et al. ................. 713/320 |
| 2011/0271283 | A1 * | 11/2011 | Bell et al. ..................... 718/102 |
| 2011/0283124 | A1 * | 11/2011 | Branover et al. ............. 713/323 |

* cited by examiner

*Primary Examiner* — Thomas Lee
*Assistant Examiner* — Zhipeng Wang
(74) *Attorney, Agent, or Firm* — Rabin & Berdo, P.C.

(57) ABSTRACT

The present invention relates to an apparatus for controlling power of mufti core processor, which includes a power control device by core unit, controls a plurality of power-related parameters by core unit, and thus decreases a load for power management and enables realization of a low power multi core processor through minute power control. The apparatus includes a processor core adapted to provide code information on an application program for executing to a power regulation controller, and a power regulation controller adapted to receive the code information on the application program from the processor core to determine an operation frequency of the processor core, set an operation voltage, a clock-gating value and a power-gating value according to the determined operation frequency, and provide the set values and voltage to the processor core.

5 Claims, 3 Drawing Sheets

Fig. 2

| Name | Status | Description |
|---|---|---|
| Power_Status | Read Only | Configure clock-gating and power-gating information by unit in 2 bits. Store 1'b1 when gating has been completed, or store 1'b0. Information is configured in total 10 bits and is disposed as follows.<br><br>{FU[1:0],EU0[1:0],EU1[1:0], EU2[1:0],MA[1:0]} |
| Run_Status | Write/Read | Store code execution status of processor, start bit and dependency between processors. Store ID of processor core for pre-executing, ID of processor core for receiving result of executed code.<br><br>{Pre_processor_core_ID[5:0], Post_processor_core_ID[5:0], Core_Start, Core_Done} |
| Nun_Inst | Write Only | The maximum number of instructions for executing |
| Finish_Time | Write Only | As time for finishing code execution, store time interval from enabling of Code_Start to enabling of Core_Done as difference of RTC value. |

APPARATUS AND METHOD FOR CONTROLLING POWER RELATED PARAMETERS BY CORE UNIT ACCORDING TO DETAILED STATUS INFORMATION OF THE CORE AND APPLICATION FOR EXECUTING

CROSS-REFERENCE TO RELATED APPLICATIONS

The present application claims priority to Korean patent application number 10-2010-0117121, filed on Nov. 23, 2010, which is incorporated by reference in its entirety.

BACKGROUND OF THE INVENTION

The present invention relates to an apparatus for controlling power of multi core processor and a method thereof, and more particularly, to a an apparatus for controlling power of multi core processor and a method thereof, which include a power control device by core unit, control a plurality of power-related parameters by core unit, and thus decrease the load for power management and enable realization of a low power multi core processor through minute power control.

In processors, generally, an independent chip for power management that is externally mounted controls a frequency or a voltage level outside the processor.

In this case, even when configuring a processor with a mufti core, since only one power controller is externally mounted, the load is too large for the one power controller to control power control information for the each core of the processor, and it is difficult to differently and minutely control a power per single core.

In configuring of a mufti processor, moreover, respective processors may include power controllers that are mounted on different dies.

In this case, distributed power controllers are mounted on the respective processors, but there is a limitation in that only a voltage level is controlled.

Moreover, the power controller mounted on the each processor controls a power-related parameter only by processor unit.

Even in this case, it is difficult to minutely control a power by core unit, and clock gating and power gating of a specific block cannot be performed according to a frequency.

The technical configuration described above is provided to aid in understanding the present invention, and does not denote widely-known technology in the related art to which the present invention pertains.

SUMMARY OF THE INVENTION

Embodiments of the present invention are directed to an apparatus for controlling power of mufti core processor and a method thereof, which include a power control device by processor core unit, control a plurality of power-related parameters by processor core unit, and thus decrease the load for power management and enable realization of a low power multi core processor through minute power control.

In one embodiment, an apparatus for controlling power of mufti core processor includes: a processor core adapted to provide code information on an application program for executing to a power regulation controller; and a power regulation controller adapted to receive the code information on the application program from the processor core to determine an operation frequency of the processor core, set an operation voltage, a clock-gating value and a power-gating value according to the determined operation frequency, and provide the set values and voltage to the processor core.

The power regulation controller may include: a register adapted to store control and status information of the processor core based on the code information which is transmitted from the processor core; a control unit adapted to read the control and status information of the processor core from the register to determine the operation frequency of the processor core, and set the operation voltage, the clock-gating value and the power-gating value according to the operation frequency; and an output unit adapted to output the operation frequency, the operation voltage, the clock-gating signal, and the power-gating signal which are determined by the control unit, to the processor core.

The control and status information of the processor core may include a power status, code execution status, number of instructions for executing and finish time for finishing code execution of the processor core.

The power regulation controller may be included by processor core unit.

In another embodiment, a method for controlling power of mufti core processor includes: receiving code information on an application program from a processor core; reading control and status information of the processor core on the code information to determine an operation frequency of the processor core; setting an operation voltage, a clock-gating value and a power-gating value according to the determined operation frequency of the processor core; and providing the operation frequency, the operation voltage, the clock-gating signal and the power-gating signal to the processor core.

The determining of an operation frequency may include: reading the maximum number of instructions for executing and Instruction Per Clock (IPC) in a finish time for finishing code execution and a predetermined condition from the control and status information of the processor core, and calculating the number of code execution cycles; and calculating a finish time at a lowest operation frequency using the calculated number of code execution cycles, and determining the lowest operation frequency which allows code execution to be finished before the finish time.

BRIEF DESCRIPTION OF THE DRAWINGS

FIG. 2 shows a list and operation of a register according to one embodiment of the present invention.

DESCRIPTION OF SPECIFIC EMBODIMENTS

Figure 1:
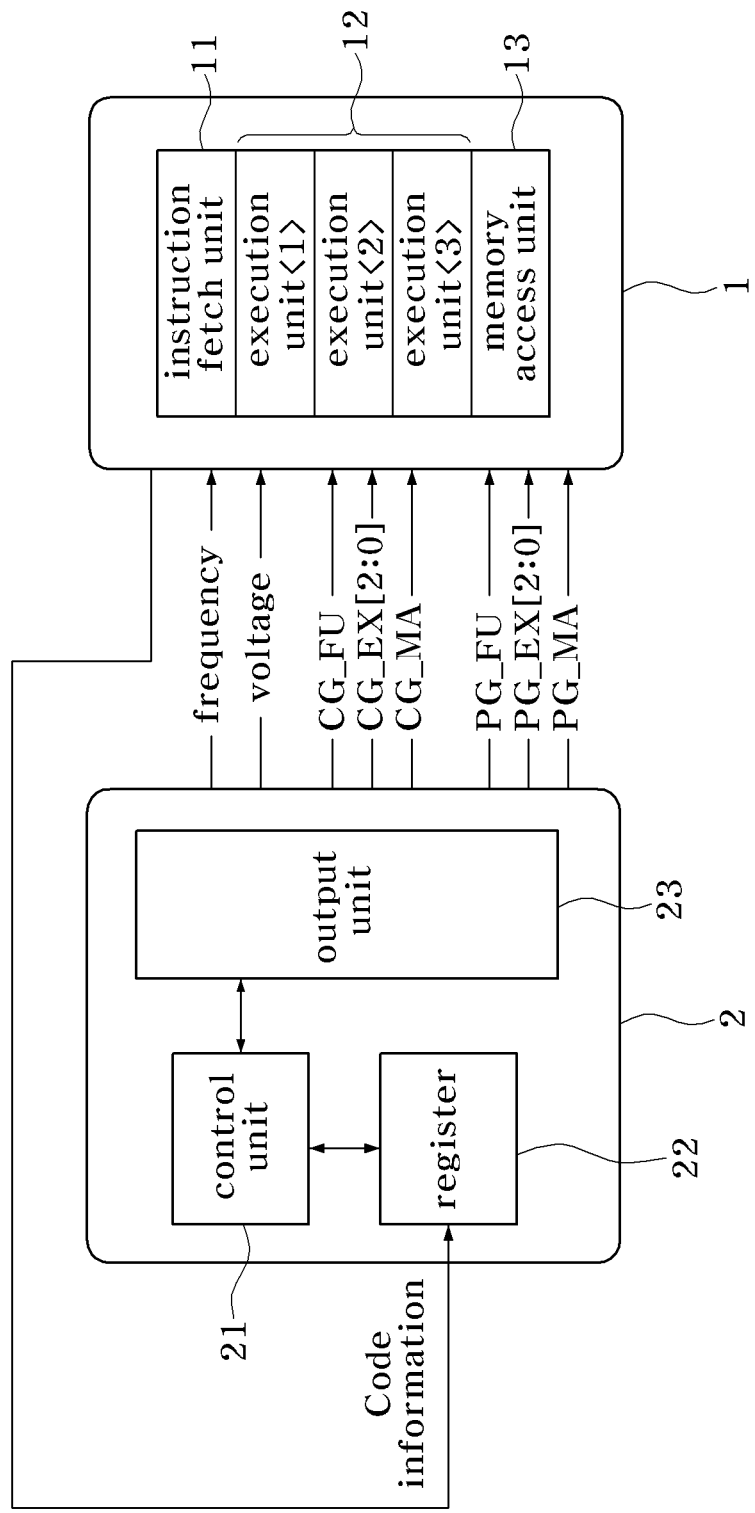
FIG. 1 illustrates a configuration of an apparatus for controlling power of multi core processor according to one embodiment of the present invention.

Hereinafter, an apparatus for controlling power of mufti core processor and a method thereof in accordance with the present invention will be described in detail with reference to the accompanying drawings.

Hereinafter, the present invention will be described in more detail through embodiments. The embodiments are merely for exemplifying the present invention, and the scope of protective rights of the present invention shall not construed as being limited by the embodiments.

In the drawings, the thicknesses of lines or the sizes of elements may be exaggeratedly illustrated for clarity and convenience of description. Moreover, the terms used henceforth have been defined in consideration of the functions of the present invention, and may be altered according to the intent of a user or operator, or conventional practice. Therefore, the terms should be defined on the basis of the entire content of this specification.

Hereinafter, embodiments of the present invention will be described in more detail with reference to the accompanying drawings.

FIG. 1 illustrates a configuration of an apparatus for controlling power of multi core processor according to one embodiment of the present invention. FIG. 2 shows a list and operation of a register according to one embodiment of the present invention.

Referring to FIGS. 1 and 2, an apparatus for controlling power of multi core processor according to one embodiment of the present invention includes a processor core 1 and a power regulation controller 2.

The processor core 1 includes an instruction fetch unit 11 for fetching an instruction, a plurality of execution units 12 for decoding and executing the instruction, and a memory access unit 13 for writing back the executed result and accessing a memory.

The processor core 1 executes a power control program and an application program that are stored in the memory and provides code information on the application program to the power regulation controller 1. The power regulation controller 2 receives the code information to determine an operation frequency. The power regulation controller 2 sets an operation voltage, a clock-gating value and a power-gating value according to the determined operation frequency, and provides the set values and frequency to the processor core 1.

The power regulation controller 2 controls a power with a power control algorithm suitable for the power control program and the application program that are executed by the processor core 1.

The power regulation controller 2 includes a register 22, a control unit 21, and an output unit 23.

The register 22 stores the control and status information of the processor core 1 that includes the power status, code execution status, number of instructions for executing and finish time for finishing code execution of the processor core 1.

The control unit 21 reads the power status, code execution status, number of instructions for executing and finish time for finishing code execution of the processor core 1 from the register 22 to determine an operation frequency and an operation voltage, and sets a clock-gating value and a power-gating value.

When the control unit 21 knows the finish time for finishing code execution and the maximum number of instructions for executing, it may know the Instruction Per Clock (IPC) of the processor core 1 based on combination of the execution units 12, and know the number of code execution cycles of the processor core 1 on the basis of the latency and throughput information of the memory.

number of code execution cycles=number of instructions/IPC

Herein, the control unit 21 stores IPC, which is changed according to combination of the execution units 12 and latency of the memory, as a table.

Moreover, the control unit 21 calculates a finish time at the lowest operation frequency using the calculated number of code execution cycles, and determines the lowest operation frequency that allows code execution to be finished before the finish time.

The control unit 21 determines an operation voltage based on the determined operation frequency, and sets a clock-gating value and a power-gating value according to the used execution unit 12, instruction fetch unit 11 and memory access unit 13.

The output unit 23 outputs the operation frequency, the operation voltage, clock-gating signals CG_FU, CG_EX[2:0] and CG_MA, and power-gating signals PG_FU, PG_EX[2:0] and PG_MA which are determined according to the control of the control unit 21, to the processor core 1.

The power regulation controller 2 is included by homogeneous processor core unit, and thus allows the processor core 1 to control a power autonomously.

Figure 3:
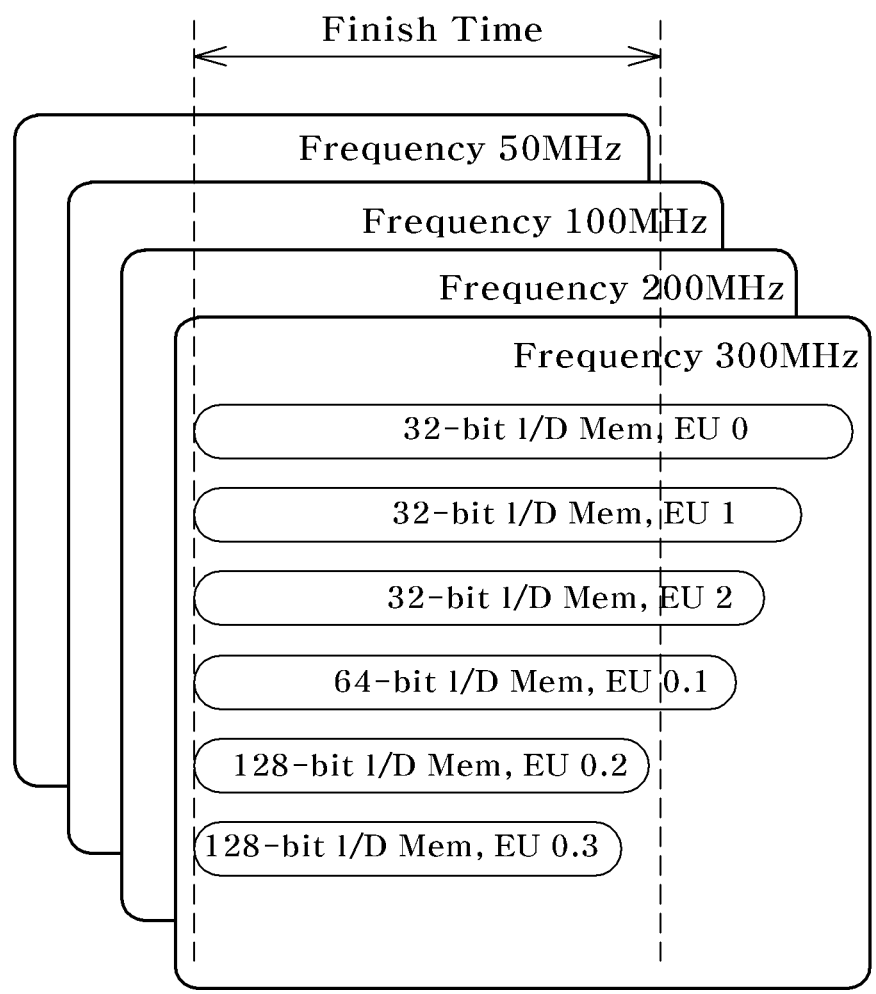
FIG. 3 illustrates a matrix for determining a power mode according to one embodiment of the present invention.

FIG. 3 illustrates a matrix for determining a power mode according to one embodiment of the present invention.

Referring to FIG. 3, power modes for the processor core 1 are divided according to an operation frequency, and moreover, they are divided according to combination of the execution units 12 and a memory access bandwidth.

An operation speed of the processor core 1 based on each of the power modes is calculated, and a power mode where a code execution time based on the operation speed is in a finish time becomes a candidate. Finally, a power mode that uses few resources at a lower operation frequency is selected.

FIG. 3 compares power modes that control the execution units 12 and memory access units 13 of total six processor cores 1 according to operation frequencies of 50 MHz, 100 MHz, 200 MHz and 300 MHz.

A power control method of the above-described apparatus for controlling power of mufti core processor according to one embodiment of the present invention will be described below.

First, the processor core 1 executes the power control program and the application program that are stored in the memory, and provides code information on the application program to the power regulation controller 2.

Then, the control unit 21 of the power regulation controller 2 reads the power status, code execution status, number of instructions for executing and finish time for finishing code execution of the processor core 1 from the register 22, and determines the lowest operation frequency that allows code execution to be finished before the finish time.

Herein, determining of the operation frequency calculates the number of code execution cycles with the maximum number of instructions for executing and IPC in a finish time for finishing code execution and a predetermined condition, calculates a finish time at the lowest operation frequency using the calculated number of code execution cycles, and determines the lowest operation frequency that allows code execution to be finished before the finish time.

Subsequently, the control unit 21 determines an operation voltage based on the determined operation frequency, and sets a clock-gating value and a power-gating value according to the used execution unit 12, instruction fetch unit 11 and memory access unit 13.

The output unit 23 outputs the operation frequency, the operation voltage, the clock-gating signals CG_FU, CG_EX[2:0] and CG_MA, and the power-gating signals PG_FU, PG_EX[2:0] and PG_MA which are determined by the control unit 21, to the processor core 1.

As described above, the present invention controls a plurality of power-related parameters by processor core unit, and thus decreases the load for power management and realizes a low power mufti core processor through minute power control.

Moreover, the present invention controls the plurality of power-related parameters by processor core unit, and thus can reduce communication between the processor cores, thereby enhancing performance.

While the present invention has been described with respect to the specific embodiments, it will be apparent to those skilled in the art that various changes and modifications may be made without departing from the spirit and scope of the invention as defined in the following claims.

What is claimed is:

1. An apparatus for controlling power of multi core processor, the apparatus comprising:
   a processor core adapted to provide code information on an application program for executing to a power regulation controller; and
   a power regulation controller adapted to receive the code information on the application program from the processor core to determine an operation frequency of the processor core, set an operation voltage, a clock-gating value and a power-gating value according to the determined operation frequency, and provide the set values and voltage to the processor core;
   wherein the power regulation controller comprises a register adapted to store control and status information of the processor core based on the code information which is transmitted from the processor core; and
   wherein the control and status information of the processor core comprises a power status, code execution status, number of instructions for executing and finish time for finishing code execution of the processor core.

2. The apparatus of claim 1, wherein the power regulation controller further comprises:
   a control unit adapted to read the control and status information of the processor core from the register to determine the operation frequency of the processor core, and set the operation voltage, the clock-gating value and the power-gating value according to the operation frequency; and
   an output unit adapted to output the operation frequency, the operation voltage, the clock-gating value, and the power-gating value which are determined by the control unit, to the processor core.

3. The apparatus of claim 1, wherein the power regulation controller is comprised by processor core unit.

4. A method for controlling power of multi core processor, the method comprising:
   receiving code information on an application program from a processor core;
   reading control and status information of the processor core on the code information to determine an operation frequency of the processor core;
   setting an operation voltage, a clock-gating value and a power-gating value according to the determined operation frequency of the processor core; and
   providing the operation frequency, the operation voltage, the clock-gating value and the power-gating value to the processor core;
   wherein determining the operation frequency comprises:
   reading the maximum number of instructions for executing and Instruction Per Clock (IPC) in a finish time for finishing code execution and a predetermined condition from the control and status information of the processor core, and calculating the number of code execution cycles.

5. The method of claim 4, wherein determining the operation frequency further comprises:
   calculating a finish time at a lowest operation frequency using the calculated number of code execution cycles, and determining the lowest operation frequency which allows code execution to be finished before the finish time.

* * * * *